(12) United States Patent
Rea et al.

(10) Patent No.: US 6,908,665 B2
(45) Date of Patent: *Jun. 21, 2005

(54) RADIATION-CURED, LAMINATED FLEXIBLE PACKAGING MATERIAL

(75) Inventors: Kevin D. Rea, Wauwatosa, WI (US); Stephen C. Lapin, Waterford, WI (US); Paul Eugene Snowwhite, Jr., Dexter, MI (US)

(73) Assignee: Northwest Coatings L.L.C., Oak Creek, WI (US)

(*) Notice: Subject to any disclaimer, the term of this patent is extended or adjusted under 35 U.S.C. 154(b) by 100 days.

This patent is subject to a terminal disclaimer.

(21) Appl. No.: 10/347,463

(22) Filed: Jan. 21, 2003

(65) Prior Publication Data

US 2003/0161976 A1 Aug. 28, 2003

Related U.S. Application Data

(60) Continuation-in-part of application No. 10/253,810, filed on Sep. 25, 2002, now Pat. No. 6,720,050, which is a division of application No. 09/348,662, filed on Jul. 6, 1999, now Pat. No. 6,472,056.
(60) Provisional application No. 60/349,429, filed on Jan. 22, 2002, now abandoned.

(51) Int. Cl.[7] .............................................. B32B 27/08
(52) U.S. Cl. ................. 428/216; 428/306.6; 428/308.8; 428/335; 428/483; 428/511; 428/516
(58) Field of Search .............................. 428/216, 306.6, 428/308.8, 335, 483, 511, 516

(56) References Cited

U.S. PATENT DOCUMENTS

| | | |
|---|---|---|
| 3,810,825 A | 5/1974 | Mani |
| 4,374,898 A | 2/1983 | Mahr |
| 4,389,472 A | 6/1983 | Neuhaus et al. |
| 4,533,723 A | 8/1985 | Weitemeyer |
| 4,643,730 A | 2/1987 | Chen et al. |
| 4,704,310 A | 11/1987 | Tighe et al. |
| 4,767,654 A | 8/1988 | Riggsbee |
| 5,202,361 A | 4/1993 | Zimmerman et al. |
| 5,262,216 A | 11/1993 | Popat et al. |
| 5,284,688 A | 2/1994 | Hiatt |
| 5,286,128 A | 2/1994 | Gillum |

(Continued)

FOREIGN PATENT DOCUMENTS

| | | | |
|---|---|---|---|
| EP | 0198374 A2 | * 10/1986 | |
| EP | 0560939 | * 9/1993 | |
| JP | 54093026 | 7/1979 | |
| JP | 58108280 | 6/1983 | |
| JP | 59179675 | 10/1984 | |
| JP | 06107993 A | * 4/1994 | ........... C09D/11/00 |

OTHER PUBLICATIONS

Trakhtenberg, "Factors Affecting Bond Strengths of UV Curable Laminating Adhesives", Northwest Coatings Corp., 1998, Oak Creek, Wisconsin, no page numbers provided.

*Primary Examiner*—Sandra M. Nolan
(74) *Attorney, Agent, or Firm*—Jeffrey S. Melcher; Manelli Dension & Selter, PLLC

(57) ABSTRACT

Provided are laminated flexible packaging materials (20) suitable for containing a pharmaceutical, food or beverage grade product. The laminated flexible packaging material includes a layer of flexible packaging material (26) bound to at least one other layer of flexible packaging material (22) by a radiation-cured laminating adhesive composition (24) formulated from a radiation-curable laminating adhesive containing at least 50% of one or more radiation-curable, carboxylic acid functional monomers and 0.1 to 20% of an organic titanate compound. Also provided is a radiation-curable laminating adhesive containing at least 50% of one or more radiation-curable, carboxylic acid functional monomers and 0.1 to 20% of an organic titanate compound.

41 Claims, 3 Drawing Sheets

U.S. PATENT DOCUMENTS

| | | |
|---|---|---|
| 5,385,772 A | 1/1995 | Slovinsky et al. |
| 5,399,396 A | 3/1995 | Ohlsson et al. |
| 5,672,224 A | 9/1997 | Kaufmann |
| 5,830,571 A | 11/1998 | Mann et al. |
| 5,861,201 A | 1/1999 | Blackwelder et al. |
| 5,874,143 A | 2/1999 | Peloquin et al. |
| 5,912,381 A | 6/1999 | Narayan et al. |
| 6,472,056 B1 * | 10/2002 | Rea et al. .................... 428/216 |
| 6,720,050 B2 * | 4/2004 | Rea et al. ................... 428/35.7 |

* cited by examiner

RADIATION-CURED, LAMINATED FLEXIBLE PACKAGING MATERIAL

This application is a continuation-in-part application of U.S. Ser. No. 10/253,810, filed on Sep. 25, 2002, now U.S. Pat. No. 6,720,050; which is a divisional application of U.S. Ser. No. 09/348,662, filed on Jul. 6, 1999, now U.S. Pat. No. 6,472,056; the complete disclosures of which are incorporated herein by reference. This application also claims priority from U.S. Ser. No. 60/349,429, filed on Jan. 22, 2002, now abandoned, the complete disclosure of which is incorporated herein by reference.

FIELD OF THE INVENTION

The invention relates to a radiation-cured, laminated flexible packaging material. The invention also relates to a radiation-curable adhesive composition suitable for use in forming the laminated flexible packaging material.

BACKGROUND OF THE INVENTION

Flexible packaging is widely used for food, non-food, and pharmaceutical applications. Flexible packaging uses a wide range of different types of materials including various types of plastic films, paper, and aluminum foil. The plastic films include various types of polyolefins, polyesters, and polyamides. The films may be various combinations of homopolymers, copolymers, and polymer blends. The films may be a single layer or may be coextruded in multiple layers. The films are also commonly coated, metalized, or otherwise treated to enhance the performance of the resulting package. Packaging materials are selected based on a variety of factors including desired barrier properties, appearance, cost, physical feel, printability, sealing properties, easy open features, and reclosing features.

Two main classes of flexible packaging materials are: 1) mono-web packaging, which includes a mono-web of a coextruded film; and 2) laminated packaging. Laminate packaging is often desired due to the fact that it is advantageous to combine two or more webs in order two obtain the desired properties of the resulting package. Reasons for using laminated packaging constructions include: 1) to contain the graphics between layers in order to provide protection and enhanced appearance; 2) to maintain product freshness by taking advantage of the barrier properties of the individual layers; 3) to combine a heat stable web for printing with a heat sealable web for sealing the package; 4) to provide desired feel and handling properties to maximize consumer appeal; 5) to enhance the package strength in order to maintain integrity for filling, shipping, and consumer handling.

Several different technologies are used to bond the layers used in laminated packaging. Two classes of laminating technology are extrusion lamination and adhesive lamination. Extrusion lamination involves melting and depositing a layer of thermal plastic resin such as polyethylene between two webs of packaging materials. The different types of adhesives currently used to laminate flexible packing materials include: 1) one component solvent base; 2) two component solvent base; 3) one component water base; 4) two component water base; and 5) two component solventless.

Solvent base adhesives have inherent limitations that include: 1) emission of volatile organic compounds (VOCs); 2) high cost of solvent incineration or recovery equipment; 3) flammability; and 4) analysis and control of residual solvents in the package.

Water base adhesives have inherent limitations that include: 1) the need for extended drying equipment; 2) the effect of heat used in drying on thermally sensitive packaging films; 3) variable drying rates dependant on ambient humidity levels; and 4) difficulty in starting and stopping due to adhesive drying on the application equipment.

Any two component system (solvent base, water base, or solventless) has inherent disadvantages that include: 1) the need for accurate mixing of the two components; 2) limited pot life of the mixed components; and 3) the time delay (typically 2 to 5 days) required for the two components to react to achieve the final adhesive properties. Other limitations associated with two component solventless adhesives include: 1) the need for heated application equipment; and 2) residual toxic aromatic amines, which are byproducts of isocyanate based curing systems.

Radiation-curable adhesives can potentially offer numerous advantages over these other flexible packaging laminating adhesives. They may offer: 1) stable one-part compositions; 2) little or no VOCs; and 3) full adhesive performance immediately upon cure. UV curable laminating adhesives require at least one layer of packing material that is sufficiently transparent to allow penetration of UV light to cure the adhesive. EB curing has the added advantage of being able to penetrate opaque or printed packaging materials in order to cure the adhesive.

The main challenge in the development of radiation-curable laminating adhesives are: 1) two provide bonding and chemical resistance that is adequate for desired packaging application; and 2) have low odor, taint, and migration to allow packaging of food and pharmaceutical products.

Radiation-curable materials such as inks and coatings are generally based on relatively low molecular weight reactive monomers and oligomers. The components are designed to be converted to high molecular weight polymers upon UV or EB irradiation. High conversions of the low molecular weight components can be achieved; however, some residual amount of monomer or oligomers normally remains. These residual components can be responsible for odor, taint, and migration issues in the packaging. The art of radiation-curable inks and coatings does not address the same problems associated with flexible laminate packaging materials, and, thus, one skilled in the art would not be motivated to look to the art of radiation-curable inks and coatings when addressing the problems associated with radiation-curable adhesives for use in laminates.

A discussion of the issues associated with the use of radiation-curable materials in food packaging applications may be found in PCT Application number WO 02/081576 (Chatterjee), which is incorporated herein by reference. The compositions disclosed by Chatterjee contain water, which is displaced from the ink or coating upon radiation-curing. This cannot be done with a laminating adhesive since the water would be trapped between two layers of packaging materials and, thus, Chatterjee is not helpful in addressing the problems associated with radiation-curable adhesives for use in making laminates.

In radiation-curable laminating adhesives, the residual low molecular weight components are initially found within the cured adhesive, which is located between two layers of packaging materials. Some types of packaging materials, such as aluminum foil, are good barrier materials and are effective for preventing migration of low molecular weight components in to the food or pharmaceutical product. Other packaging materials, such as polyolefin based materials, are known to be less effective barriers to migration of low molecular weight organic compounds. Thus, there is a need for a radiation-curable adhesive material that when suitably cured exhibits substantially reduced migration through layers in a laminated flexible packaging material.

Flexible packaging materials also have problems with delamination of the layers during normal use, especially when the package contains aggressive liquids or certain aggressive food products. Delamination can also be an issue during processing or the package. This can include the addition of closures, filling, sealing, and heat processing. Thus, there is a need for a radiation-curable adhesive material that when suitably cured exhibits sufficient adhesion to prevent delamination of the layers during normal use.

SUMMARY OF THE INVENTION

An objective of the invention is to provide radiation-cured, laminated flexible packaging materials, which do not leach residual radiation-curable monomers into the contents thereof and exhibit sufficient adhesion to avoid delamination of the layers during normal use.

Another objective is to provide radiation-curable laminating adhesives that can be used to form laminated flexible packaging materials which do not leach radiation-curable monomers into the contents thereof and exhibit sufficient adhesion to avoid delamination of the layers during normal use.

The above objective and other objectives are surprisingly obtained by using a radiation-curable laminating adhesive formulated from carboxylic acid functional monomers and organic titanate compounds.

The invention provides a novel laminated flexible packaging material suitable for containing a pharmaceutical or food grade product comprising at least two layers of flexible packaging materials bonded together by a radiation-cured laminating adhesive, wherein the radiation-curable laminating adhesive comprises at least 50% of one or more carboxylic acid functional (meth)acrylate monomers which are the half-ester formed by the reaction of a hydroxy(meth)acrylate compound with an organic anhydride, and about 0.1 to about 20% of at least one selected from the group consisting of organic titanates, organic zirconates, organic aluminates, and organic zinc. Organic titanates and organic zirconates are preferred, with organic titanates being most preferred.

The invention also provides a novel radiation-curable laminating adhesive comprising at least 50% by weight of one or more carboxylic acid functional (meth)acrylate monomers which are the half-ester formed by the reaction of a hydroxy(meth)acrylate compound with an organic anhydride, and 0.1 to 20% by weight of at least one selected from the group consisting of organic titanates, organic zirconates, organic aluminates, and organic zinc. Organic titanates and organic zirconates are preferred, with organic titanates being most preferred.

The present invention also relates to products packaged in the flexible packaging material.

DETAILED DESCRIPTION OF PREFERRED EMBODIMENTS

Radiation-Curable Laminating Adhesive

Figure 1:
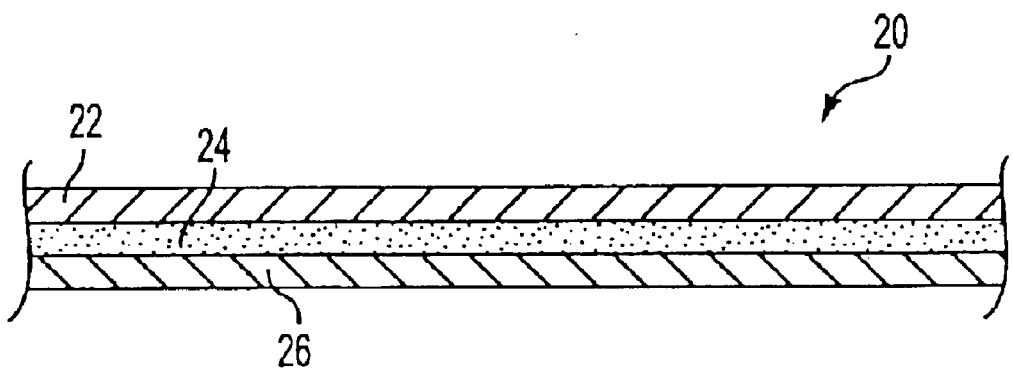
FIG. 1 illustrates a side, cross-sectional view of a radiation-cured, laminated flexible packaging material.

The radiation-curable laminating adhesive (hereinafter referred to as "radiation-curable adhesive composition") comprises at least 50 wt. % of one or more carboxylic acid functional, radiation-curable monomers (hereinafter referred to as "carboxylic acid functional monomer"). Preferably, the radiation-curable adhesive composition comprises at least 80 wt. % of one or more carboxylic acid functional monomers, and more preferably at least 90 wt. % of one or more carboxylic acid functional monomers. All wt. % are based on the total weight of the radiation-curable composition unless stated otherwise herein. While the radiation-curable composition may contain conventional non-carboxylic acid functional monomers if desired, preferably substantially all of the radiation-curable monomers present in the radiation-curable adhesive comprise at least one carboxylic acid functional group.

Preferably, the carboxylic acid functional monomers are selected such that when a radiation-cured laminate is formed using the radiation-curable adhesive, the laminate exhibits less than 50 ppb extraction of uncured monomer. As shown in Example 5, one skilled in the art will easily be able to select carboxylic acid functional monomer(s) to provide a suitable extraction value for a desired flexible packaging material.

The carboxylic acid functional monomer preferably has a number average molecular weight of from about 100 to about 3000, more preferably from about 150 to about 2000, and most preferably from about 200 to about 1500. The simplest type of carboxylic acid functional monomer is acrylic acid. However, acrylic acid is not desirable because of odor, toxicity and low molecular weight. Therefore, preferred radiation-curable adhesive compositions are substantially free of acrylic acid.

One skilled in the art will easily be able to form the desired carboxylic acid functional monomer based on well known reaction mechanisms. For example, using the well known reaction between a hydroxyl functional group and an anhydride, a compound containing both a hydroxyl functional group and a desired radiation-curable functional group can be reacted with an anhydride compound to form the desired carboxylic acid functional monomer. Suitable anhydrides include, but are not limited to: phthalic anhydride; maleic anhydride; trimellitic anhydride; tetrahydrophthalic anhydride; hexahydrophthalic anhydride; tetrachlorophthalic anhydride; adipic anhydride; azelaic anhydride; sebacic anhydride; succinic anhydride; glutaric anhydride; malonic anhydride; pimelic anhydride; suberic anhydride; 2,2-dimethylsuccinic anhydride; 3,3-dimethylglutaric anhydride; 2,2-dimethylglutaric anhydride; dodecenylsuccinic anhydride; nadic methyl anhydride; octenyl succinic anhydride, HET anhydride; and the like.

The compound containing a hydroxyl functional group and a radiation-curable functional group ("hydroxy functional, radiation-curable compound") can contain any desired radiation-curable functional group suitable for the desired application. The radiation-curable functional group preferably comprises ethylenic unsaturation. Examples of suitable ethylenic unsaturation include acrylate, methacrylate, styrene, vinylether, vinyl ester, N-substituted acrylamide, vinyl amide, maleate esters or fumarate esters. Preferably, the ethylenic unsaturation is provided by an acrylate or methacrylate group. Use of the term "(meth) acrylate" refers to either acrylate or methacrylate, or mixtures thereof.

Examples of suitable hydroxy functional, radiation-curable compounds containing (meth)acrylate groups include the following, but are not limited thereto: 2-hydroxyethyl (meth)acrylate; 2-hydroxypropyl (meth)acrylate; 2-hydroxybutyl (meth)acrylate; 2-hydroxy 3-phenyloxypropyl (meth)acrylate; 1,4-butanediol mono(meth)acrylate; 4-hydroxycyclohexyl (meth)acrylate; 1,6-hexanediol mono(meth)acrylate; neopentylglycol mono (meth)acrylate; trimethylolpropane di(meth)acrylate; trimethylolethane di(meth)acrylate; pentaerythritol tri(meth)acrylate; dipentaerythritol penta(meth)acrylate; and hydroxy functional (meth)acrylates represented by the following formula,

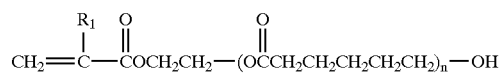

wherein $R_1$ is a hydrogen atom or a methyl group and n is an integer from 1 to 5. Commercially available examples include the hydroxy terminated (meth)acrylate prepolymers sold as "Tone" prepolymers (Dow Chemical). The (meth) acrylate compounds can be used either alone or in admixture of two or more of them. Among these (meth)acrylate compounds, 2-hydroxyethyl (meth)acrylate and 2-hydroxypropyl (meth)acrylate are especially preferred. Examples of hydroxy functional, radiation-curable compounds having vinyl ether functional groups include, for example, 4-hydroxybutyl vinyl ether, and triethylene glycol monovinyl ether.

Preferably, the radiation-curable functional group is acrylate or methacrylate, with acrylate being the most preferred.

A particularly preferred carboxylic acid functional monomer is the product of the reaction of 2-hydroxyethylacrylate (HEA) with succinic anhydride, as shown in the following formula:

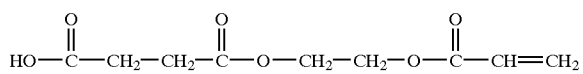

If desired, the carboxylic acid functional monomer can also be formed by reacting a suitable dicarboxylic acid functional compound with a hydroxy functional, radiation-curable compound. However, this method is not preferred since water is formed during the reaction of the hydroxyl group with a carboxylic acid group, which water must be removed prior to use of the carboxylic monomer in the radiation-curable adhesive composition.

Carboxylic acid functional monomers and oligomers can also be formed by various combinations of polyanhydrides and/or polyols, as desired.

While not preferred, oligomeric forms of acrylic acid can also be used as the carboxylic acid functional monomer, which can be formed, for example, by dimerizing or trimerizing acrylic acid by well known self addition reactions. A stable dimer compound is betacarboxyethylacrylate ("BCEA"). However, BCEA is not preferred since it usually contains residual amounts of acrylic acid.

One skilled the art will easily be able to formulate the radiation-curable adhesive composition to provide a suitable viscosity for the desired application. Usually, the viscosity of the radiation-curable adhesive composition should be low, for example about 3000 centipoise or less, at the application temperature, to facilitate application to the substrate. Usually, the application temperature is room temperature (25° C.). However, higher application temperatures can be utilized as desired. The carboxylic acid functional monomer preferably has a low viscosity, in order to avoid the use of diluent monomers, to provide a viscosity that is suitable for application of the radiation-curable adhesive to a layer of flexible packaging material. Suitable viscosities of the carboxylic functional monomer include from about 50 to about 10,000 centipoise at the application temperature, more preferably from about 100 to about 5000 centipoise at the application temperature.

It has also been found that certain combinations of carboxylic acid functional monomers are advantageous because of their enhanced bonding characteristics and reduced migration properties. In particular, monomers formed from the reaction of hydroxyl acrylates and alkene substituted succinic anhydrides or phthalic anhydride are useful in formulations to improve the water resistance of the finished laminate. The monomers may be used in various ratios. The preferred ratio will depend on the specific materials that are being bonded, as shown in Example 5. One skilled in the art will easily be able to select suitable combinations of carboxylic acid functional monomers to provide the desired migration and adhesion properties for the selected layer of flexible packaging material based on the disclosure provided herein, without undue experimentation.

When the radiation-curable adhesive is formulated for curing by exposure to visible light, ultraviolet light, or the like, one or more photoinitiators and/or photosensitizers can be used as polymerization initiators to enhance the cure speed. Examples of suitable photoinitiators and photosensitizers include but are not limited to: 2,2'-(2,5-thiophenediyl) bis(5-tert-butylbenzoxazole); 1-hydroxycyclohexyl phenyl ketone; 2,2-dimethoxy-2-phenylacetophenone; xanthone; fluorenone; anthraquinone; 3-methylacetophenone; 4-chlorobenzophenone; 4,4'-dimethoxybenzophenone; 4,4'-diaminobenzophenone; Michler's ketone; benzophenone; benzoin propyl ether; benzoin ethyl ether; benzyl dimethyl ketal, 1-(4-isopropylphenyl)-2hydroxy-2-methylpropane-1-one; 2-hydroxy-2-methyl-1phenylpropane-1one; methylbenzoyl formate thioxanthone; diethylthioxanthone; 2-isopropylthioxanthone; 2-chlorothioxanthone; 2-methyl-1-(4-(methylthio)phenyl)-2-morpholinopropane-1-one; and 2,4,6-trimethylbenzoyidiphenylphosphine oxide. Commercially available examples include IRGACURE 184, 369, 500, 651, 819, 907, and 2959, and Darocur 1173 (Ciba Geigy); Lucirin TPO (BASF); and Ebecryl P36 and P37 (UCB Co.).

Preferably, polymeric photoinitiators are utilized in the radiation-curable adhesive composition. The use of polymeric photoinitiators further reduces the possibility of photoinitiator or fragments of the photoinitiator migrating. Examples of suitable polymeric photoinitiators include, but are not limited to, the commercially available KIP 100, KIP 150 and Esacure KK (Lamberti).

If desired, one or more photoinitiators and/or photosensitizers can be incorporated in the radiation-curable adhesive coating composition in an amount of about 0.1 to about 10% by weight of the total composition.

If the radiation-curable adhesive composition is formulated to utilize a free-radical curing system by exposure to an electron beam, a photoinitiator is generally not beneficial. However, in cationically cured systems, a photoinitiator is beneficial even when performing an electron beam cure. Based on the disclosure provided herein, one skilled in the art of formulating radiation-curable adhesive compositions will easily be able formulate a suitable curing system for the desired application, without undue experimentation.

The radiation-curable adhesives can also contain radiation-curable oligomers. Migration is generally not a concern with oligomers due to their higher molecular weight relative to the molecular weight of monomers. (Meth) acrylate functional oligomers are preferred. These include but are not limited to epoxy(meth)acrylates, urethane(meth) acrylates, polyester(meth)acrylate oligomers, (meth) acrylated acrylic oligomers, and (meth)acrylated oligomers based on copolymers of maleic anhydride, such as those sold under the tradename of Sarbox (Sartomer).

The adhesive compositions can be formulated to provide improved bond strengths and improved water resistance properties when suitably cured in laminated structures by incorporating one or more organic titanate compounds. While many different titanate compounds may be used, certain titanates are preferred due to their stability in the presence of carboxylic acid functional monomers. Certain titanates also provide superior bonding characteristics. Useful levels of titanate compounds are from about 0.1 to about 20% by weight, preferably from about 1 to about 15% by weight, based on the total weight of the composition.

Organic titanates are a well-known class of chemical compounds. The two major classes of organic titanates are tretraalkyl titanates and titanate chelates. Teraalkyl titanates have the general structure $Ti(OR)_4$, where R is the residue of an organic alcohol such as isopropyl alcohol, n-butanol, 2-ethyl hexyl acohol, etc. The organic portion of titanate chelates have more than one active sight that may be coordinated to the titanium. Examples of the organic portion of a titanate chelate include triethanol amine, acetoacetonate, and ethyl acetoacetate. A discussion of organic titanates is a available in a General Brochure for Tyzor trade name products available from DuPont.

Organic titanates have several known commercial uses. These include catalysts for esterification reactions, surface modification of organic and inorganic materials, reagents for creation of gel-sols, and cross-linkers for polymers. The use of organic titanates in radiation-curable laminating adhesive compositions according to the present invention are heretofore unknown.

The present invention relates to the incorporation of organic titanate compounds in radiation-curable laminating adhesives for packaging applications. In particular it has been found to be advantageous to incorporate organic titanate compounds based on carboxylic acid functional monomers. The primary advantage of the organic titanate compounds is to provide enhanced bonding along with moisture and chemical resistance in the laminated packaging materials.

A commercial example of an organic titanate incorporating a carboxylic acid functional monomer is KR 39DS from Kenrich Petrochemicals. This organic titanate has three acrylic acid groups and one dietyhyleneglycol monomethyl ether group. However, when this titanate is incorporated into an adhesive formulation containing additional carboxylic acid functional monomer, the acid group will equilibrate releasing free acrylic acid. Acrylic acid is not desired due to problems with odor, toxicity, and low molecular weight, and should be avoided.

We have found that it is advantageous to use organic titanate compounds based carboxylic acid functional monomers that are substantially free of acrylic acid. These include carboxylic acid functional monomers described earlier which are the reaction products of hydroxy functional (meth)acrylate compounds with organic anhydrides.

Desired organic titanate compounds may be formed by the reaction of the carboxylic functional monomers with alkyl titanates. This involves the displacement and evaporation of the corresponding alkyl alcohol. For example, the half-ester of 2-hydroxyethylacrylate and succinic anhydride may be reacted with tetraisopropyl titanate. This reaction is driven by the evaporation of isopropyl alcohol. In some cases it may be desirable to use organic titanates that have both chelate groups and alkyl groups. An example is bistriethanol amine diisporopyl titanate. In this case, one would expect that only the isopropyl alcohol groups would be displaced by the carboxylic acid monomers.

These compounds formed by the reaction hydroxy (meth) acrylate-anhydride half esters with alkyl titanates are novel materials.

The new carboxylic acid monomer titanate compounds may be prepared and isolated as shown in Example 1. Alternatively, these compounds may be formed in-situ by incorporating the desired organic titanate in the adhesive formulation containing carboxylic acid functional monomers as shown in Examples 3 through 7. Generally, for food applications it is not desirable to have the liberated alkyl alcohol present in the adhesive. In these cases, the alcohol may be evaporated from the mixture by heating, mixing, sparging, or processing the mixture at reduced pressure.

In place of the organic titanate, it is believed that organic zirconates, organic aluminates, and/or organic zinc, may also provide improved adhesion properties in the present adhesive compositions. However, organic titanates and organic zirconates are preferred, with organic titanates being most preferred.

The radiation-curable adhesive can also include additives such as fillers, flow additives, anti-foaming additives, pigments, dyes, or resinous materials dispersed or solubilized in the composition. The selection and use of such additives is within the skill of the art.

When suitably cured, the carboxylic acid functional monomers used in the present invention have been found to provide the unexpected combination of sufficient adhesion to low surface energy layers, such as polyolefin protective films, to avoid delamination and substantially avoid migrating through the layers the in the uncured free-monomer form.

The radiation-curable adhesive composition can also be used to form improved laminated flexible packaging materials, as described below.

Laminated Flexible Packaging Material

The formation of laminated flexible packaging materials is well-known and therefore will not be discussed in detail herein. The novel laminated flexible packaging materials described herein can be easily produced using conventional techniques and replacing conventional laminating adhesives with the radiation-curable laminating adhesives described herein. Preferred methods of applying the radiation-curable adhesive includes use of well-known web coating methods such as roll coating, gravure, offset gravure, etc. The adhesive may be applied and cured in-line with the printing or off-line in a separate laminating step as desired.

When using low surface energy layers, such as polyolefins, preferably the surface of the layer to be bonded has been surface-treated to enhance adhesion. Surface treating is well known and any conventional surface treating method can be used as desired for the particular application. Examples of suitable surface treating methods include corona treatments, chemical treatments, plasma and flame treatments. Preferably, when a polyolefin based layer is utilized a corona treatment or flame treatment is first applied to the surface prior to bonding with a radiation-curable adhesive.

The laminated flexible packaging material will be described with reference to FIGS. 1–3. As shown in FIGS.

1–3, the laminated flexible packaging material 20 includes at least one second layer of flexible packaging material 22 laminated to a first layer of flexible packaging material 26 by the novel radiation-cured, adhesive 24, where layer 26 is the layer that will be on the inside of the finished package. The laminated flexible packaging material 20 can also include other layers as desired. Examples of suitable materials for the at least one second layer 22 and first layer 26 include, but are not limited to: paper, aluminum foil, metalized films, coated films, printed films, co-extruded films, polyester films, polyolefin based films, white polyolefin based films, polyamide based films, copolymer films, and films containing various polymer blends. Preferably, the first layer 26 is polyolefin based.

The radiation-curable laminating adhesive described herein can be used to provide an improved laminated flexible packaging material in which the problem of contamination from migrating monomers is substantially reduced. It has been found that the carboxylic acid monomers of the radiation-curable adhesive composition migrate through layers of the flexible packaging materials, especially polyolefins, in significantly less amounts than monomers used in conventional radiation-curable adhesives. It has also been found that the carboxylic acid monomers used in the present invention provide sufficient adhesion to many types of packaging materials when suitably cured to avoid delamination of the laminated flexible packaging material during use.

The radiation-curable, adhesive composition described herein can be applied and cured using conventional techniques, such as by UV light from medium pressure mercury lamps directly through the layers. When using ultra-violet (UV) light to cure the radiation-curable adhesive composition, a polymeric material should be selected which does not prevent or substantially inhibit curing of the radiation-curable adhesive by absorbing or shielding the UV light. Thus, at least one of the second layer 22 or the first layer 26 is preferably substantially clear when UV curing is desired. A substantially clear layer 22 can be formed from any suitable material. Examples of suitable substantially clear polymeric materials include polyolefins, polyesters and polystyrenes. Preferably, the layer 22 is formed from a polyolefin.

Alternatively, electron beam radiation (EB) may be used to cure the radiation-curable adhesive composition. The layer 22 and the layer 26 do not need to be substantially clear when EB curing is utilized.

Examples of suitable polyolefins for use in a preferred layer 26 and/or when polyolefin is used in the layer 22 include, but are not limited to, homopolymers or copolymers of ethylene, butylene, propylene, hexene, octene, etc. Preferred polyolefin based films include polypropylene and polyethylene, such as high-density polyethylene (HDPE) or linear-low-density polyethylene (LLDPE), polyiosbutylene (PIB). Oriented forms of polypropylene can be used as desired, such as biaxially oriented (BOPP) or oriented polypropylene (OPP).

If desired, the polyolefin for use in layer 22 or 26 may be coated, blended, copolymerized or coextruded with other materials to enhance the barrier, handling, appearance or sealing properties. These modifications are included in the definitions of "polyolefin based" and "comprising polyolefin" for the layers 22 or 26. Common coatings include polyvinylidene chloride (PVdC), acrylic based coatings, and various other barrier and-heat-seal coatings. The polyolefin may also receive a thin layer of metal using a vacuum metalization process. Common polyolefin copolymers used to produce films for flexible packaging include copolymers of ethylene and vinlyacetate (EVA), and ethylene and vinyl alcohol (EVOH), ethylene and acrylic acid, ethylene and ethyl acrylate. In spite of the fact that many of these modifications are known to improve the barrier properties of polyolefins, a migrating resistant laminating adhesive is still desirable to prevent off-flavor and odor in the packaged product.

U.S. Pat. No. 5,399,396 discloses further examples of suitable layers for use in the laminated flexible packaging material, which are incorporated herein by reference. Other suitable layers are described in Diane Twede and Ron Goddard, "Packaging Materials," $2^{nd}$ Edition, Pira International, Surry, UK 1998.

Figure 2:
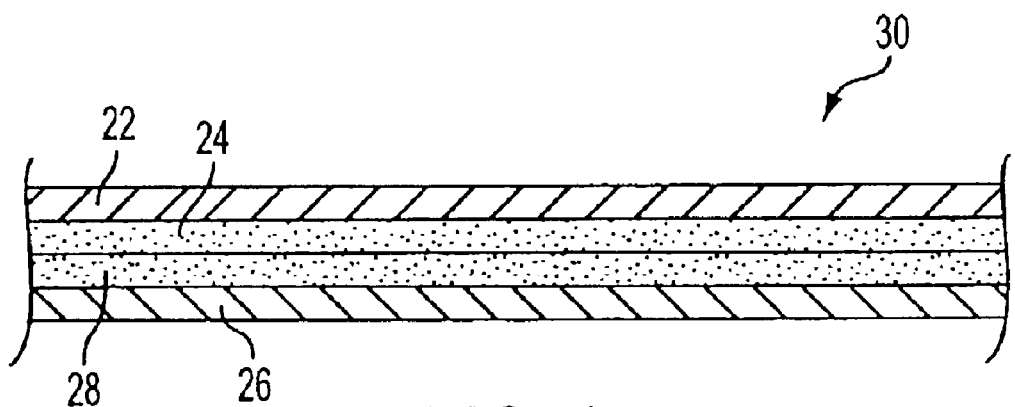
FIG. 2 illustrates a side, cross-sectional view of a radiation-cured, laminated flexible packaging material.

Another example of a laminated flexible packaging material is shown in FIG. 2, which includes a clear layer 26 comprising a polyolefin which has been reverse printed 28 on inside surface thereof and then bonded to a layer 22 using the radiation-curable, adhesive composition 24. In this type package, the printed material would be readable on the inside surface of the package.

Figure 3:
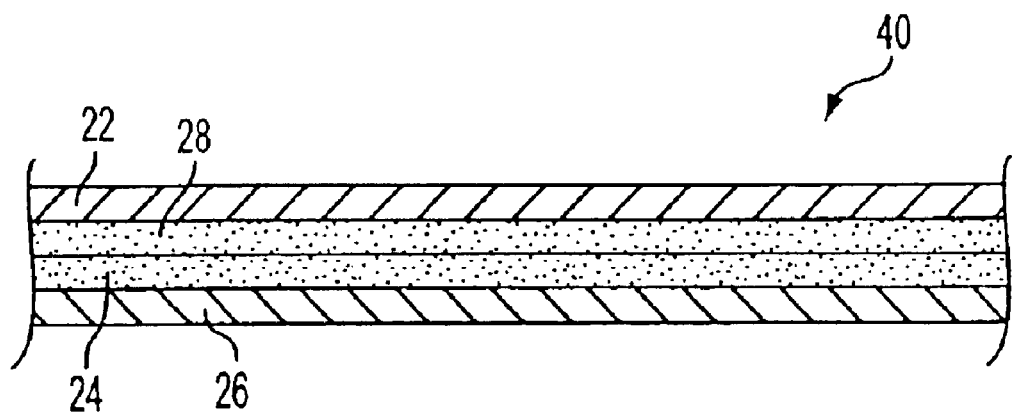
FIG. 3 illustrates a side, cross-sectional view of a radiation-cured, laminated flexible packaging material.

As shown in FIG. 3, another example of laminated flexible packaging material includes a clear layer 22 which has been reverse printed 28 on inside surface thereof and then bonded to a layer 26 using the radiation-curable, adhesive composition 24. In this type of package, the printed material would be readable on the outside of the package.

While not shown in the drawings, a further example of a laminated flexible packaging material includes a clear layer bonded to a white polyolefin layer having printed material on an outside surface thereof bonded together using the radiation-curable, adhesive composition. The printing can be performed using any conventional method, such as well-known ink and/or electrophotographic techniques. Preferred methods include the use of a flexographic or gravure printing press to apply print in a continuous line.

The layer 22, layer 26 and adhesive layer 24 can be constructed at any thickness as desired for the particular application. For example, the layer 22 is usually about 0.1 to about 5 mils thick, preferably about 0.3 to about 3 mils thick. The adhesive layer 24 is usually about 0.03 to about 1 mil thick, preferably about 0.05 to about 0.2 mils thick. The layer 26 is usually about 0.1 to about 5 mils thick.

Figure 4:
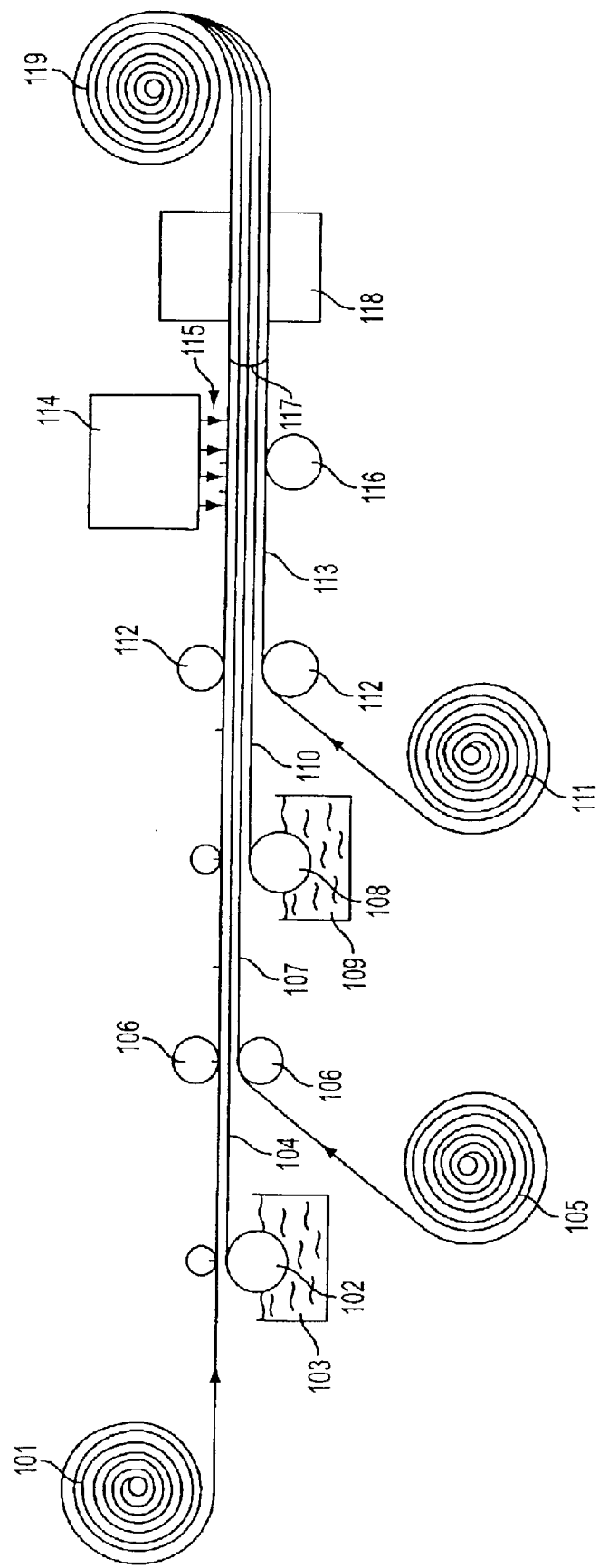
FIG. 4 illustrates a side view of a radiation lamination process.

The laminated flexible packaging material can be formed by using any conventional process. FIG. 4 illustrates an example of a radiation lamination process for making a 2-layer flexible laminate packaging material, and an optional 3-layer flexible laminate packaging material. Any number of layers can be bonded together using the present radiation-curable adhesive.

A first layer of flexible packaging material 101 is unwound. The first layer 101 may be fed from a roll or directly from a printing press used to apply graphics to the packaging. An adhesive coating 103 is applied to the layer 101 using the coating application roller 102 to form and adhesive coating layer 104. This is a simplified drawing. Many different types of roll coating methods may be used including methods with up to about 6 rollers. The adhesive reservoir holding the adhesive coating 103 may be open or closed. Liquid adhesive may also be pumped from a feed system. The adhesive application system including the adhesive 103 and roller(s) 102 may be at be at ambient temperature, or heated facilitate achieving the desired application weight and flow properties.

A second layer of flexible packaging material 105 is unwound and applied to the adhesive coating layer 104 using the nip rollers 106 to form a 2-layer laminate 107. The nip rollers 106 can be made of various different materials including, for example, rubber, steel, and ceramic. Roll pressure can be set for best performance and appearance. The rollers 106 may be at ambient temperature or heated.

An optional second laminating adhesive application roller 108 can be used to apply a second adhesive coating 109 to form an adhesive coating 110 on the laminate 107. The optional third layer of flexible packaging material 111 is unwound and applied to the adhesive coating 110 using the optional second set of laminating nip rollers 112 to form a 3-layer laminate 113.

Electron beam generating unit or UV lamp unit 114 then applies accelerated electrons or UV radiation to the laminate 113 to cure at least one of the adhesive coatings 104 and/or 110. If UV is used, the layer(s) of flexible packaging materials must allow at least partial transmission of UV light to cure the adhesive(s). Opaque or printed materials may be used with EB since accelerated electrons can penetrate through layers of opaque packaging materials. EB accelerating potential should be at least high enough to penetrate the layers of packaging materials to cure the adhesives. The equipment should be shielded to prevent worker exposure to the UV light or secondary x-rays which are associated with EB generation. An optional back-up roller or beam dump 116 may be chilled to control excess heat from the curing process.

Commercial electron beam generating units are available from multiple suppliers including Energy Sciences Inc., (ESI) and Advanced Electron Beams (AEB). The penetration of the electrons into the packaging material is determined by the acceleration potential of the beam. Generally a range of potentials from about 60 to 250 KV is appropriate for most flexible packaging laminations. A range of about 70 to 170 KV is preferred. The total electron beam energy (dose) applied to the material is measured in units of Mrads. A range of dosages from about 0.5 to 6.0 Mrads is appropriate for curing the adhesives of the present invention. A dosage range of about 1.0 to 4.0 Mrads is preferred.

The cured laminate 117 can be forwarded to an optional post-cure web processing, which usually includes trimming, slitting, and/or sheeting. The cured laminate 117 can be rewound to form a roll 119 for laminated web of packaging material.

Preferably, both adhesives 104 and 110 are radiation-curable adhesives according to the present invention. However, one of the adhesives may be non-radiation-curable if desired. In multiple layer laminates, at least one adhesive layer must comprise a radiation-curable adhesive according to the present invention. Radiation-curable adhesives must be applied before the curing unit 114. Non-radiation-curable adhesives may be applied before or after the curing unit 114. This is a simplified drawing for illustration purposes. Other web treating, cleaning, handling, and coating accessories are typically part or the process.

The immediate EB or UV cure allows fast in-line processing. However, with other types of laminating adhesives, it is difficult to process in-line since the adhesive may not be adequately cured in a short time period.

The improved laminated flexible packaging material can be used to contain beverages, pharmaceuticals, medical and dental devices, and food products. Preferred examples are snack food packaging, dry food mixes, meat packaging, cheese packaging, and flavored beverage containers. It may also be desirable to use the improved laminated flexible packaging for non-food industrial or consumer packaging. Although taste or and migration may not be a concern for non-food applications, the immediate bonding and resistance to delamination achieved with these new radiation-curable laminating adhesives may be desired. Examples of industrial and consumer non-food applications includes packaging wet and dry wipe products.

Figure 5:
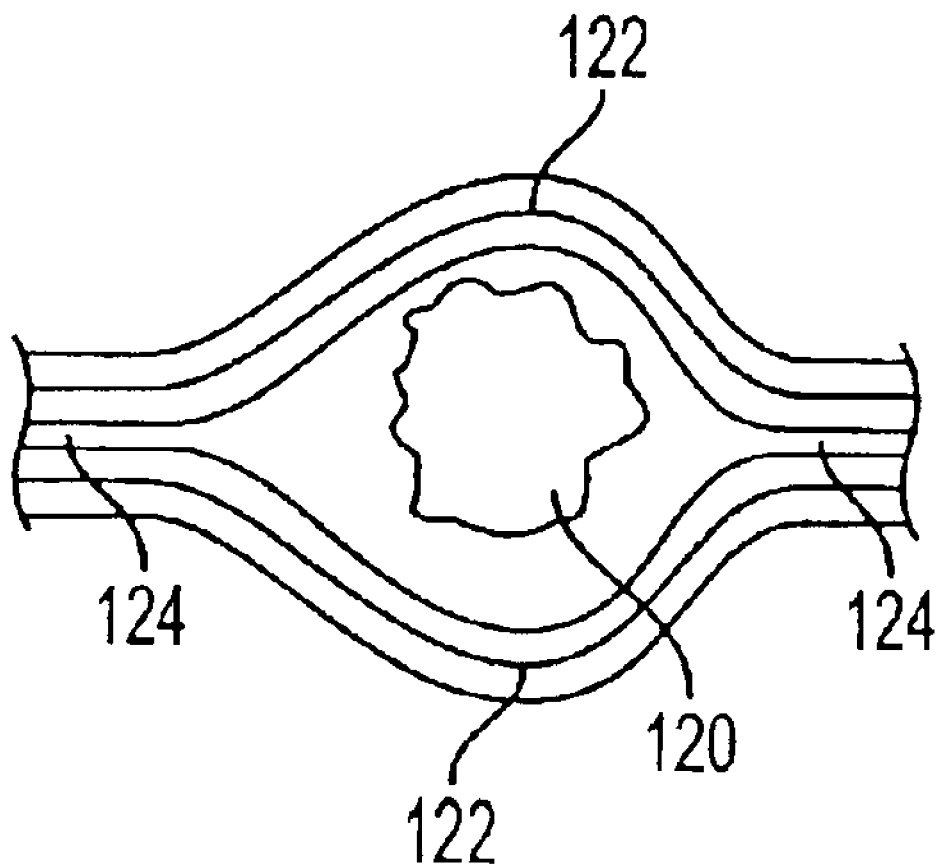
FIG. 5 illustrates a side, cross-sectional view of a packaged product.

The packages can be formed using any conventional process. FIG. 5 illustrates a cross-sectional view of a packaged material 120 contained within the flexible packaging material 122. The edges 124 of the flexible packaging material 122 can be sealed using any conventional sealing method, such as heat sealing or cold sealing using adhesives, as desired.

The invention will now be further described with reference to the following non-limiting Examples and Comparative Examples. The migration of the carboxylic acid functional monomers of the radiation-curable, adhesive composition have been tested using food industry standards. The test results clearly demonstrate that the carboxylic acid functional monomers migrate through layers of a laminated flexible packaging material to a significantly less degree than monomers utilized in conventional radiation-curable adhesives. Thus, the improved radiation-curable, adhesive composition is capable of providing an adhesive layer which substantially reduces the risk of uncured monomers migrating through flexible packaging layers and contaminating the contents of a packaged product with uncured monomer.

The test results also demonstrate that when the present radiation-curable adhesives are suitably cured they exhibit improved adhesion and resistance to delamination, especially when liquids are present.

The new and improved adhesive compositions according to the present invention are illustrated by the following examples:

EXAMPLE 1

A UV/EB curable titanate compound was prepared by reacting 4.4 molar equivalents of the carboxylic acid functional monomer which is the half-ester of 2-hydroxy ethyl acrylate (HEA) and succinic anhydride (HEA-succinate monomer) with 1.0 molar equivalents of titanium tetraisoproxide. Isopropyl alcohol was removed by heating the mixture under a vacuum. The resulting product was a high viscosity clear reddish liquid. A titanium content of 4.8% was determined gravimetrically as $TiO_2$ by heating to a dry ash. This is in excellent agreement with the expected 4.8% theoretical titanium content demonstrating that the product is a new titanate compound incorporating 4 moles HEA-succinate per mole of titanium.

EXAMPLE 2

The organic titanate compound from Example 1 was used in the adhesive formulations shown in Table 1. For comparison the "A" formula did not contain titanate. Thin films of each adhesive (approximate 0.1 mil) were applied to various layers of flexible packaging materials. A second layer of flexible packaging material was laid onto the wet adhesives and the resulting laminates were cured by EB irradiation at 165 kV with a dosage of 3.0 Mrads. The bond strength of the resulting laminates was determined using tensile testing equipment in a T-peel configuration at a speed of 12 inches/min. The results are shown in the Table below. The results show increased bond strength for the oPP/metalized oPP laminates in the presence of the titanate compound. The results also show that the titanate improves the water resistance for the two polyester (PET) film laminations.

TABLE 1

| | A | B | C |
|---|---|---|---|
| Adhesive Formula (wt %) | | | |
| HEA-succinate | 99.8 | 94.8 | 89.8 |
| Titanate From Example 1 | | 5.0 | 10.0 |
| Fluorosurfactant | 0.2 | 0.2 | 0.2 |
| Average Peel Strength (g/in) | | | |
| oPP/metalized oPP | 210 | Film Tear | Film Tear |
| PET/LLDPE (dry) | Film Tear | Film Tear | Film Tear |
| PET/LLDPE (1 hr water) | 174 | 181 | 237 |
| PET/Al foil (dry) | Film Tear | Film Tear | Film Tear |
| PET/Al foil (1 hr water) | 46 | 68 | 102 |

EXAMPLE 3

A series of titanate compounds were incorporated into UV curable laminating adhesives as shown in Table 2. The adhesives were applied at a thickness of approximately 0.2 mils to a polypropylene film. A second layer of polypropylene film was placed over the wet adhesives. The adhesives were then cured by UV exposure through the top film with a 300 w/in medium pressure mercury arc lamp at a conveyor speed of 100 ft/min to form laminates. The bond strengths of the laminates were determined by a T-peel test. The results show a significant increase in the adhesive strength in the presence of all of the titanate compounds. The stability was checked upon storage for one month at room temperature. The mixture containing the triethanol amine titanate remained liquid with no precipitation (ppt) and no noticeable change in viscosity.

TABLE 2

| Adhesive Formula (parts by wt) | A | B | C | D | E |
|---|---|---|---|---|---|
| HEA-succinate | 95 | 95 | 95 | 95 | 95 |
| Lucerin TPO, BASF | 3 | 3 | 3 | 3 | 3 |
| Titanium acetyl acetonate | | 5 | | | |
| Octylene glycol titanate | | | 5 | | |
| Triethanol amine titanate | | | | 5 | |
| Tetra 2-ethyihexyl titanate | | | | | 5 |
| Average peel strength (g/in) | 136 | 191 | 172 | 191 | 159 |
| Solution stability, one month | clear | ppt. | ppt. | clear | ppt. |

EXAMPLE 4

An experimental design was conducted to evaluate adhesive compositions containing up to 4.0 percent triethanol amine titanate, up to 10 percent of difunctional monomer, which is the reaction product of one equivalent of benzophenone dianhydride with two equivalents of an hydroxy acrylate based on caprolactone (Tone M-100), and up to 15 percent of a difunctional aromatic urethane acrylate oligomer (Sartomer CN973). The balance of the formula was composed of HEA-succinate monomer. The test formulations were coated onto a web of inner packaging layer using an offset gravure coater. The adhesive weight was controlled to 1.2±0.2 pounds/3000 ft2. A web of outer packaging material was nipped to the wet adhesive. The laminates were then cured by exposing the moving web to an electron beam at 165 kV at a dosage of 3.0 Mrads. The bond strengths of the laminates was measured by T-peel testing. The optimum adhesive formulations obtained from the analysis of the T-peel data are shown in Table 3. The results show the benefits of the titanate compound in the adhesive formulas.

TABLE 3

| Outer Layer Material | oPP | OPP | PET |
|---|---|---|---|
| Inner Layer Material | oPP | Metalized oPP | LLDPE |
| HEA-succinate (wt %) | 98 | 96 | 77.31 |
| Urethane acrylate (wt %) | 0 | 0 | 8.69 |
| Difunctional monomer (wt %) | 0 | 0 | 10 |
| Triethanol amine titanate (wt %) | 2 | 4 | 4 |
| Maximum Peel Strength (g/in) | 315 | 277 | 273 |
| Average Peel Strength (g/in) | 231 | 249 | 226 |

EXAMPLE 5

An experimental design was conducted to evaluate adhesive compositions containing three different monomers, which are half esters of 2-hydroxyethyl acrylate (HEA) with acid anhydrides. The three anhydrides were succinic anhydride, phthalic anhydride, and 2-dodecenyl succinic anhydride (DSA). The compositions contained at least 20% HEA-succinate, up to 80 percent HEA-phthalate, up to 80 percent HEA-DSA, and up to 8% triethanol amine titanate. All compositions also contained 0.2% of a fluorosurfactant. The adhesives were coated and cured as described in Example 4. The water resistance of the laminates was measured by conducting T-peel testing immediately after 1 hour immersion of a one inch wide strip in water. The optimum adhesive formulations obtained from the analysis of the T-peel data are shown in Table 4. The T-peel results for a 96% HEA-succinate, 4% triethanol amine titanate formulation are also shown for comparison. The results show the advantage of having the HEA-phthalate and HEA-dodecenyl succinate monomers in the formulations in order to achieve improved water resistance.

TABLE 4

| Outer Layer Material | oPP | oPP | OPP | OPP | PET | PET | PET | PET |
|---|---|---|---|---|---|---|---|---|
| Inner Layer Material | oPP | oPP | Met. oPP | Met. oPP | LLDPE | LLDPE | Al foil | Al foil |
| HEA-succinate (wt %) | 20.27 | 96 | 89.65 | 96 | 20.0 | 96 | 20.17 | 96 |
| HEA-phthalate (wt %) | 0 | 0 | 0 | 0 | 53.1 | 0 | 0.60 | 0 |
| HEA-dodecenyl succinate (wt %) | 79.73 | 0 | 2.35 | 0 | 18.9 | 0 | 71.53 | 0 |
| Triethanolamine titanate (wt %) | 0 | 4 | 8.0 | 4 | 8.0 | 4 | 7.7 | 4 |
| Peel Strength After Water Soak (g/in) | 175 | 140 | 193 | 184 | 346 | 246 | 273 | 152 |

EXAMPLE 6

An adhesive formulation was prepared comprising 94.9 wt % HEA-succinate, 4% trethanol amine titanate, and 0.1% fluorosurfactant. The adhesive was coated onto a web of coextruded packaging film based on ethylene vinyl alcohol copolymer (EVOH) and linear low density polyethylene (LLDPE). A web of polyester (PET) packaging film was nipped to the wet adhesive and the adhesive was cured by exposing the moving web through the PET side using a 110 KV electron beam at a dosage of 3.0 Mrads to form laminates. The laminates were extracted from the LLDPE side using Miglyol 812 at 66° C. for 2 hours followed by 40° C. for 238 hours. This protocol is recognized by the FDA as a method to test suitability for of packaging materials for food applications. The tests were run in triplicate and validated with appropriate controls at an independent laboratory. No adhesive components were detected in the extracts with detection limits of 50 PPB.

EXAMPLE 7

Five adhesive formulations were prepared as shown in Table 5. The adhesives were used to bond two layers of 0.7 mil oriented polypropylene (oPP) film. The adhesives were applied and EB cured using the procedure described in Example 4. Any attempts to separate the films resulted in immediate tearing of the oPP films. This illustrates the excellent bonding of the adhesives. The laminated films were mounted in single side test cell, which contained 10 milliliters of 95% ethanol for each 1.0 square inch of laminated area. The laminates were extracted for 10 days at 40° C. This is a test protocol recognized by FDA to determine the suitability of packaging materials for use in food applications. The extraction results for three of the adhesive components are shown in Table 5. The important points illustrated by this example are: 1) The importance high levels carboxylic acid monomers in order to achieve low extraction levels (A, B, C have 91.8% total carboxylic acid monomer compared to 59.8% for D and 39.8% for E); 2) The benefit using multiple carboxylic acid functional monomers in the formulation (compare the extraction results for A vs. B and C); and 3) The high level of trimethylol propane triacrylate (TMPTA) monomer extracted relative to the much lower extraction of the carboxylic acid functional acrylate monomers (HEA-succinate and HEA-phthalate). TMPTA is a trifunctional monomer while the carboxylic acid functional monomers in this example are monofunctional. One skilled in the art would expect lower extraction with multifunctional materials. Thus, the lower extraction carboxylic acid functional monomers is surprising and unexpected.

TABLE 5

| Adhesive Formula (wt %) | A | B | C | D | E |
| --- | --- | --- | --- | --- | --- |
| HEA-succinate | 56.8 | 31.8 | 20.0 | 39.8 | 19.8 |
| HEA-phthalate |  | 30.0 | 35.9 | 20.0 | 20.0 |
| HEA-dodecenyl succinate | 35.0 | 30.0 | 35.9 |  |  |
| TMPTA |  |  |  | 40.0 | 60 |
| Fluorosurfactant | 0.2 | 0.2 | 0.2 | 0.2 | 0.2 |
| Triethanolamine titanate | 8.0 | 8.0 | 8.0 |  |  |
| Extraction results (PPB) |  |  |  |  |  |
| HEA-succinate | 88 | 39 | 48 | 63 | 147 |
| HEA-phthalate |  | 8.0 | 10.5 | 22.5 | 42 |
| TMPTA |  |  |  | 480 | 1155 |

EXAMPLE 8

An organic zirconate compound based on HEA-succinate monomer was prepared by Dupont under the experimental designation TLF-9566. This organic zirconate was used in the adhesive formulations shown in Table 6. For comparison the "A" formula did not contain the zirconate. Thin films of each adhesive (approximate 0.1 mil) were applied to various layers of flexible packaging materials. A second layer of flexible packaging material was laid onto the wet adhesives and the resulting laminates were cured by EB irradiation at 165 KV with a dosage of 3.0 Mrads. The bond strength of the resulting laminates was determined in a T-peel test. The results are shown in Table 6 below. The results show increased bond strength for the oPP/metalized oPP laminates in the presence of the zirconate compound. The results also show that the zirconate improves the water resistance for the two polyester (PET) film laminations.

TABLE 6

|  | A | B | C |
| --- | --- | --- | --- |
| Adhesive Formula (wt %) |  |  |  |
| HEA-succinate | 99.8 | 94.8 | 89.8 |
| Organic Zirconate TLF-9566 |  | 5.0 | 10.0 |
| Fluorosurfactant | 0.2 | 0.2 | 0.2 |
| Average Peel Strength (g/in) |  |  |  |
| oPP/metalized oPP | 210 | Film Tear | Film Tear |
| PET/LLDPE (dry) | Film Tear | Film Tear | Film Tear |
| PET/LLDPE (1 hr water) | 174 | Film Tear | Film Tear |
| PET/Al foil (dry) | Film Tear | Film Tear | Film Tear |
| PET/Al foil (1 hr water) | 46 | 93 | 49 |

The test results demonstrate that the improved radiation-curable adhesive composition is capable of providing an adhesive layer having improved adhesive properties and which substantially reduces the risk of uncured monomers migrating through a packaging material layer and contaminating the contents of a packaged product with uncured monomer.

While the claimed invention has been described in detail and with reference to specific embodiments thereof, it will be apparent to one of ordinary skill in the art that various changes and modifications can be made to the claimed invention without departing from the spirit and scope thereof.

What is claimed is:

1. A laminated flexible package material comprising at least two layers of flexible packaging materials bonded together by a radiation-cured laminating adhesive, wherein the radiation-curable laminating adhesive comprises:
   a. at least 50% of one or more carboxylic acid functional (meth)acrylate monomers which are the half-esters formed by the reaction of a hydroxy(meth)acrylate compound with an organic anhydride, and
   b. about 0.1 to about 20% of an organic titanate compound.

2. The laminated flexible packaging material of claim 1, wherein said anhydride anhydride is selected from the group consisting of phthalic anhydride; maleic anhydride; trimellitic anhydride; tetrahydrophthalic anhydride; hexahydrophthalic anhydride; tetrachlorophthalic anhydride; adipic anhydride; azelaic anhydride; sebacic anhydride; succinic anhydride; glutaric anhydride; matonic anhydride; pimelic anhydride; suberic anhydride; 2,2-dimethylsuccinic anhydride; 3,3-dimethylgiutaric anhydride; 2,2-dimethylgiutaric anhydride; dodecenylsuccinic anhydride; nadic methyl anhydride; and HET anhydride and said hydroxy (meth) acrylate compound is selected from the group consisting of 2-hydroxyethyl (meth)acrytate; 2-hydroxypropyl (meth)

acrylate; 2-hydroxybutyl (meth)acrylate; 2-hydroxy 3-phenyloxypropyl (meth)acrylate; 1,4-butanediol mono(meth)acrylate; 4-hydroxycyclohexyl (meth)acrylate; 1,6-hexanediol mono(meth)acrylate; neopentylglycol mono(meth)acrylate; trimethylolpropane di(meth)acrylate; trimethylotethane di(meth)acrylate; pentaerythritol tri(meth)acrylate; dipentaerythritol penta(meth)acrylate; octenyl succinic anhydride, and hydroxy functional (meth)acrylates represented by the following formula, $$CH_2=\overset{R_1}{\underset{|}{C}}-\overset{O}{\underset{\|}{C}}OCH_2CH_2-(\overset{O}{\underset{\|}{O}}CCH_2CH_2CH_2CH_2CH_2)_n-OH$$

wherein $R_1$ is a hydrogen atom or a methyl group and n is an integer from 1 to 5.

3. The laminated flexible packaging material of claim 1, wherein said anhydride comprises succinic anhydride.

4. The laminated flexible packaging material of claim 1, wherein said anhydride comprises phthalic anhydride.

5. The laminated flexible packaging material of claim 1, wherein said anhydride comprises alkene substituted succinic anhydride.

6. The laminated flexible packaging material of claim 5, wherein said anhydride comprises dodecenyl anhydride.

7. The laminated flexible packaging material of clam 5, wherein said anhydride comprises octenyl succinic anhydride.

8. The laminate flexible packaging material of claim 1, wherein said hydroxy (meth)acrylate compound is 2-hydroxyethyl acrylate.

9. The laminated flexible packaging of claim 1, wherein said hydroxy (meth)acrylate compound is 2-hydroxyethyl methacrylate.

10. The laminated flexible packaging material of claim 1, wherein the organic titanate comprises the reaction product of a least one titanate with one to four alkyl groups and a half-ester compound formed by the reaction of a hydroxy (meth)acrylate compound with an organic anhydride.

11. The laminated flexible packaging material of claim 10, wherein the organic titanate is formed by pre-reacting the alkyl titanate with the half-ester compound that is formed by the reaction of a hydroxy (meth)acrylate compound with an organic anhydride.

12. The laminated flexible packaging material of claim 10, wherein the organic titanate is formed in-situ with blending of other laminating adhesive components.

13. The laminated flexible packaging material of claim 1, wherein the organic titanate is formed from tetraisopropyl titanate.

14. The laminated flexible packaging material of claim 1, wherein the organic titanate is formed from triethanol amine titanate.

15. The laminated flexible packaging material of claim 1, wherein the organic titanate is present at a level of about 1 to about 15% by weight of the adhesive composition.

16. The laminated flexible packaging material of claim 1, further comprising iess than 50% by weight of at least one mono or multi-functional (meth)acrylate monomer or oligomer.

17. The laminated flexible packaging material of claim 1, wherein the adhesive is formulated to be curable by electron beam radiation through at least one layer of flexible packaging material.

18. The laminated flexible packaging material of claim 1, further comprising about 0.2 to about 15% of a photoinitiator wherein the adhesive is curable by ultraviolet radiation.

19. The laminated flexible packaging material of claim 1, wherein the layers of flexible packaging materials are selected from the group consisting of polyolefin base films, polyester based films, polyamide based films, copolymer films, coextruded polymer films, metallized films, coated films, printed films, paper, and aluminum foil.

20. The laminated flexible packaging material of claim 1, wherein the adhesive layer is present at a weight of about 0.5 to about 2.5 pounds per 3000 square feet of flexible packaging material.

21. The laminated flexible packaging material of claim 1, comprising three of more layers of flexible packaging materials that are bonded by at least two layers of said radiation-curable laminating adhesive.

22. The laminated flexible packaging material of claim 1, comprising three or more layers of flexible packaging materials that are bonded by one layer of said radiation-curable laminating adhesive and at least one layer of a non-radiation-curable adhesive.

23. A laminated flexible packaging material of claim 1, wherein said carboxylic acid monomer has a number average molecular weight of from about 100 to about 3000.

24. A laminated flexible packaging material of claim 1, wherein said carboxylic acid monomer has a number average molecular weight of from about 150 to about 2000.

25. A laminated flexible packaging material of claim 1, wherein said carboxylic acid monomer has a number average molecular weight of from about 200 to about 1500.

26. A laminated flexible packaging material of claim 1, wherein at least one layer of flexible packaging material comprises at least one polymeric material selected from the group consisting of polyolefins, polyesters, polyamides, and polystyrenes.

27. A laminated flexible packaging material of claim 1, wherein at least one layer of flexible packaging material comprises a polyolefin based film.

28. A laminated flexible packaging material of claim 1, wherein at least one layer of flexible packaging material comprises a polyethylene or polypropylene based film.

29. A laminated flexible packaging material of claim 1, wherein at least one layer of flexible packaging material comprises a polyolefin based film is coated with another material.

30. A laminated flexible packaging material of clam 29, wherein said another material comprises polyvinylidene chloride, acrylic, or a metal.

31. A laminated flexible packaging material of claim 1, wherein at least one layer of flexible packaging material comprises a polyolefin based film comprising a polyolefin blended with another material.

32. A laminated flexible packaging material of claim 1, wherein at least one layer of flexible packaging material comprises a polyolefin based film comprising a polyolefin copolymerized with another material.

33. A laminated flexible packaging material of claim 32, wherein said another material comprises vinylacetate or vinyl alcohol.

34. A laminated flexible packaging material of claim 1, wherein at least one layer of flexible packaging material comprises a polyolefin based film comprises a polyolefin coextruded with another material.

35. A laminated flexible packaging material of claim 1, wherein at least one layer of flexible packaging material comprises a polyolefin comprising at least one selected from the group consisting of homopolymers or copolymers of ethylene, butylene, propylene, hexene, and octene, copolymers of ethylene with vinyl acetate, vinyl alcohol, ethyl acrylate, or acrylic acid, and coextruded films containing a polyolefin.

36. A laminated flexible packaging material of claim 1, wherein at least one layer of flexible packaging material comprises polypropylene.

37. A laminated flexible packaging material of claim 1, wherein said radiation-curable laminating adhesive contains a polymeric photoinitiator.

38. A laminated flexible packaging material of claim 1, wherein at least one layer of flexible packaging material has a thickness of from about 0.1 mil to about 5 mils.

39. A laminated flexible packaging material of claim 1, wherein at least one layer of flexible packaging material is substantially clear and contains printed material on an inside surface thereof.

40. A laminated flexible package material comprising at least two layers of flexible packaging materials bonded together by a radiation-cured laminating adhesive, wherein the radiation-curable laminating adhesive comprises:

a. at least 50% of one or more carboxylic acid functional (meth)acrylate monomers which are the half-ester formed by the reaction of a hydroxy(meth)acrylate compound with an organic anhydride, and b. about 0.1 to about 20% of an organic zirconate compound.

41. A laminated flexible package material comprising at least two layers of flexible packaging materials bonded together by a radiation-cured laminating adhesive, wherein the radiation-curable laminating adhesive comprises:

a. at least 50% of one or more carboxylic acid functional (meth)acrylate monomers which are the half-ester formed by the reaction of a hydroxy(meth)acrylate compound with an organic anhydride, and b. about 0.1 to about 20% of at least one compound selected from the group consisting of organic zirconates, organic aluminates, and organic zinc.

* * * * *